United States Patent
Kim et al.

(10) Patent No.: US 10,027,744 B2
(45) Date of Patent: Jul. 17, 2018

(54) DEPLOYMENT OF A NETWORK RESOURCE BASED ON A CONTAINMENT STRUCTURE

(71) Applicant: ServiceNow, Inc., Santa Clara, CA (US)

(72) Inventors: Chanwook Kim, San Jose, CA (US); James Owen, Cupertino, CA (US); Vani Banaji, Sratoga, CA (US); Danny Kibel, Saratoga, CA (US); Christian Challenger-Lee, Sunnyvale, CA (US); Kashyap Ivaturi, Dublin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/496,980

(22) Filed: Apr. 25, 2017

(65) Prior Publication Data
US 2017/0310745 A1 Oct. 26, 2017

Related U.S. Application Data

(60) Provisional application No. 62/327,538, filed on Apr. 26, 2016.

(51) Int. Cl.
*G06F 15/173* (2006.01)
*H04L 29/08* (2006.01)
(Continued)

(52) U.S. Cl.
CPC ............ *H04L 67/1029* (2013.01); *G06F 8/61* (2013.01); *G06F 9/5061* (2013.01); *H04L 67/16* (2013.01);
(Continued)

(58) Field of Classification Search
CPC .. G06F 9/45533; G06F 9/45558; G06F 9/455; G06F 11/0712; G06F 21/51
See application file for complete search history.

(56) References Cited

U.S. PATENT DOCUMENTS

| 8,819,202 B1 * | 8/2014 | Carolan | ............. H04L 41/5054 709/223 |
| 8,904,005 B2 | 12/2014 | Ferris et al. | |

(Continued)

OTHER PUBLICATIONS

ServiceNow, "Suggested Relationships", Product Documentation, Asset and Configuation, Configuration Management, Date Unknown, Last modified Jul. 1, 2015, http://wiki.servicenow.com/index.php?title=Suggested_Relationships#gsc.tab=0, 3 pp.

(Continued)

*Primary Examiner* — Peling Shaw
(74) *Attorney, Agent, or Firm* — Fletcher Yoder, P.C.

(57) ABSTRACT

Systems and methods for the deployment of network resource information based on a containment structure are herein disclosed as comprising, in an implementation, determining, using a configuration item representative of a resource within the configuration management database, a first set of properties associated with a resource type, wherein the first set of properties comprises a subset of the global property set, determining a second set of properties based on deployment rules, such as a containment relationship defining properties included within a parent configuration item of the configuration management database, wherein the second set of properties comprises a subset of the first set of properties, provisioning the resource with the second set of properties, and communicating the provisioned resource for activation within the computer network. In an implementation, a deployment agent can be configured to provision a resource with the second set of properties.

26 Claims, 8 Drawing Sheets

(51) Int. Cl.
    *G06F 8/61*         (2018.01)
    *G06F 9/50*         (2006.01)

(52) U.S. Cl.
    CPC ............ *G06F 9/5005* (2013.01); *H04L 67/10* (2013.01); *H04L 67/1004* (2013.01)

(56) References Cited

U.S. PATENT DOCUMENTS

| | | | |
|---|---|---|---|
| 2005/0289536 A1* | 12/2005 | Nayak | G06F 8/61 |
| | | | 717/174 |
| 2006/0004875 A1* | 1/2006 | Baron | G06F 17/30595 |
| 2012/0066681 A1* | 3/2012 | Levy | G06F 9/5027 |
| | | | 718/1 |
| 2012/0131193 A1* | 5/2012 | Ferris | G06F 9/5072 |
| | | | 709/226 |
| 2013/0232497 A1* | 9/2013 | Jalagam | G06F 9/5072 |
| | | | 718/104 |
| 2014/0351443 A1* | 11/2014 | Tang | G06F 9/45533 |
| | | | 709/226 |
| 2015/0242204 A1* | 8/2015 | Hassine | H04L 41/5045 |
| | | | 717/121 |
| 2015/0378921 A1* | 12/2015 | Karippara | G06F 9/45533 |
| | | | 710/308 |
| 2017/0004182 A1* | 1/2017 | Simpson | G06F 17/30554 |

OTHER PUBLICATIONS

ServiceNow, "Definiing CI Relationships", Product Documentation, Asset and Configuration, Configuration Management, Date Unknown, Last modified Nov. 24, 2015, http://wiki.servicenow.com/index.php?title=Defining_CI_Relationships#gsc.tab=0, 4 pp.
International Search Report and Written Opinion for PCT Application No. PCT/US2017/029677 dated Jun. 26, 2017; 10 pgs.

* cited by examiner

DEPLOYMENT OF A NETWORK RESOURCE BASED ON A CONTAINMENT STRUCTURE

CROSS-REFERENCE TO RELATED APPLICATION(S)

This application claims priority to U.S. Provisional Patent Application No. 62/327,538, filed on Apr. 26, 2016, which is herein incorporated by reference in its entirety.

TECHNICAL FIELD

The present disclosure relates in general to techniques and devices for the deployment of a network resource based on a containment structure.

BACKGROUND

Computer networks can be used for exchanging and storing data. The service environments of a computer network can change, for example, based on institutional needs. Administration of a computer network infrastructure can include configuring new devices and software for use within the computer network. Information related to the network, devices and software within the network, and relationships between the various devices and software may be stored in a configuration management database (CMDB), wherein records containing data for the devices, software, and relationships are defined herein to be configuration items (CIs).

SUMMARY

Disclosed herein are implementations of systems and methods for deployment of a network resource based on a containment structure.

In an implementation, a system is provided for provisioning resources within a computer network. The system includes a processor, a network interface, a memory, and a configuration management database comprising configuration items representative of resources of the computer network, wherein the configuration management database defines a global property set comprising properties of the resources and the configuration items include one or more properties of the global property set, wherein the memory includes instructions executable by the processor to configure a deployment agent for provisioning a resource of the computer network with properties, the resource having a resource type, by determining, using a configuration item representative of the resource within the configuration management database, a first set of properties associated with the resource type, wherein the first set of properties comprises a subset of the global property set, and determining a second set of properties based on a containment relationship defining properties included within a parent configuration item of the configuration management database, wherein the second set of properties comprises a subset of the first set of properties, provision, by the deployment agent, the resource with the second set of properties, and communicate, by the network interface, the provisioned resource for activation within the computer network.

In an implementation, a method is provided for provisioning a resource having a resource type within a computer network associated with a configuration management database comprising configuration items representative of resources of the computer network, wherein the configuration management database defines a global property set comprising properties of the resources and the configuration items include one or more properties of the global property set. The method includes determining a first set of properties associated with the resource type using a configuration item representative of the resource within the configuration management database, wherein the first set of properties comprises a subset of the global property set, determining a second set of properties based on a containment relationship defining properties included within a parent configuration item of the configuration management database, wherein the second set of properties comprises a subset of the first set of properties, provisioning the resource with the second set of properties; and communicating the provisioned resource for activation within the computer network.

These and other implementations of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
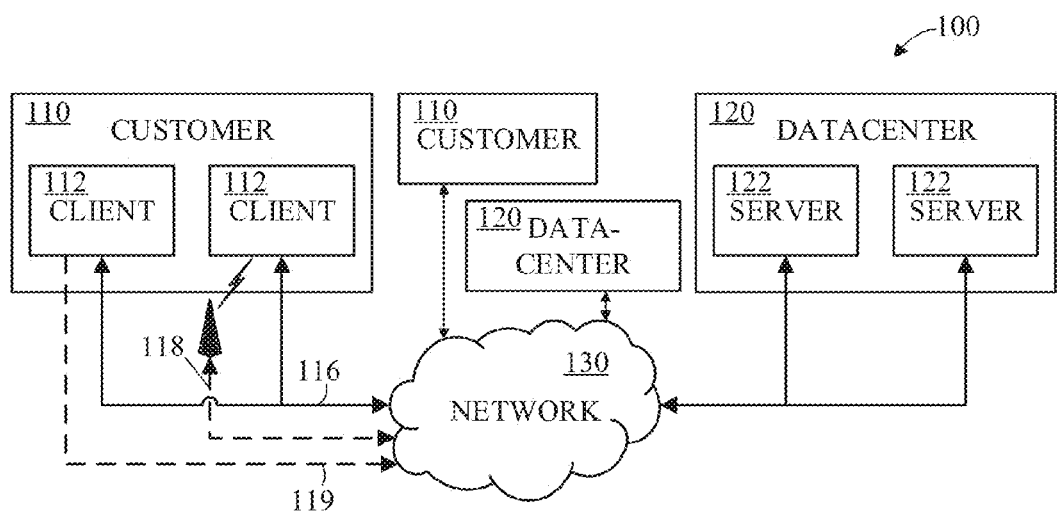
FIG. 1 is a block diagram of a distributed or cloud computing system.

Generally, deployment can refer to the provisioning of a resource, such as a device or software executed on a device, within a computer network. The deployment of a resource can be governed by, for example, the structure of the computer network, including information indicating how the resource will be used within it. In the context of a CMDB, deployment can include the use of deployment actions, or deployers, for provisioning resources based on various properties of the CIs that represent them within the CMDB. For example, a CI can include properties indicating the name or type of, and/or a serial number, IP address, or other identifier for the resource it represents. A CI can include properties for indicating how the corresponding resource connects to or receives data from other resources. For example, a CI for a web application archive (WAR) file can include a property indicating that the file is contained by a Tomcat web server (e.g., wherein the quality of being contained can refer to a dependency on the containing CI). The list of properties available for use by a deployer can be determined by the CMDB.

However, a deployer may unintentionally provision a resource within a computer network based on CI properties that are not usable by the resource. For example, the CI for the Tomcat web server discussed above can include a property indicating a file name of the WAR CI it contains. Because a Tomcat resource does not have a file name, this deployment can be considered invalid. An invalid deployment can be harmful to the computer network, for example, by causing an incomplete CI setup and/or failures in orchestrating the CMDB for instancing.

Implementations of the present disclosure describe systems and methods for the deployment of network resources based on containment structures, for example, defining relationships between the resources. In an implementation, a deployer can be created for provisioning a resource based on a CI indicating the type of the resource. For example, the properties that a CI for a Tomcat web server can include can be restricted to those properties of the CMDB that are usable for Tomcat web servers. Further, in an implementation, the list of available properties for a CI to include for deployment can be further refined based on deployment rules defining how the CI is hierarchically located and relates to other CIs within the CMDB. In this way, a user of the systems and methods described in the present disclosure, such as a system administrator, can create valid deployers for provisioning network resources within their computer network.

In an implementation, resources can refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources can also refer to computing features such as documents, models, plans, sockets, virtual machines, etc. In an implementation, resources can refer to physical and/or virtual implementations of the foregoing, as applicable. The present disclosure may occasionally make specific reference, for example, to infrastructure resources or applicative resources for certain uses of resources; however, where the disclosure merely references "resources" or "network resources," it may refer to any of the foregoing types of resources, unless the context specifically indicates otherwise. Further, the terms "configure," "provision," and the like can be used interchangeably in the context of deployment to refer to an action for or process of assigning properties to a CI corresponding to a resource.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer, a virtual machine and the like. The datacenter 120 and servers 122 are examples only, and a cloud computing system may have a different number of datacenters and servers or may have a different configuration of datacenters and servers. For example, there may be tens of datacenters and each datacenter may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
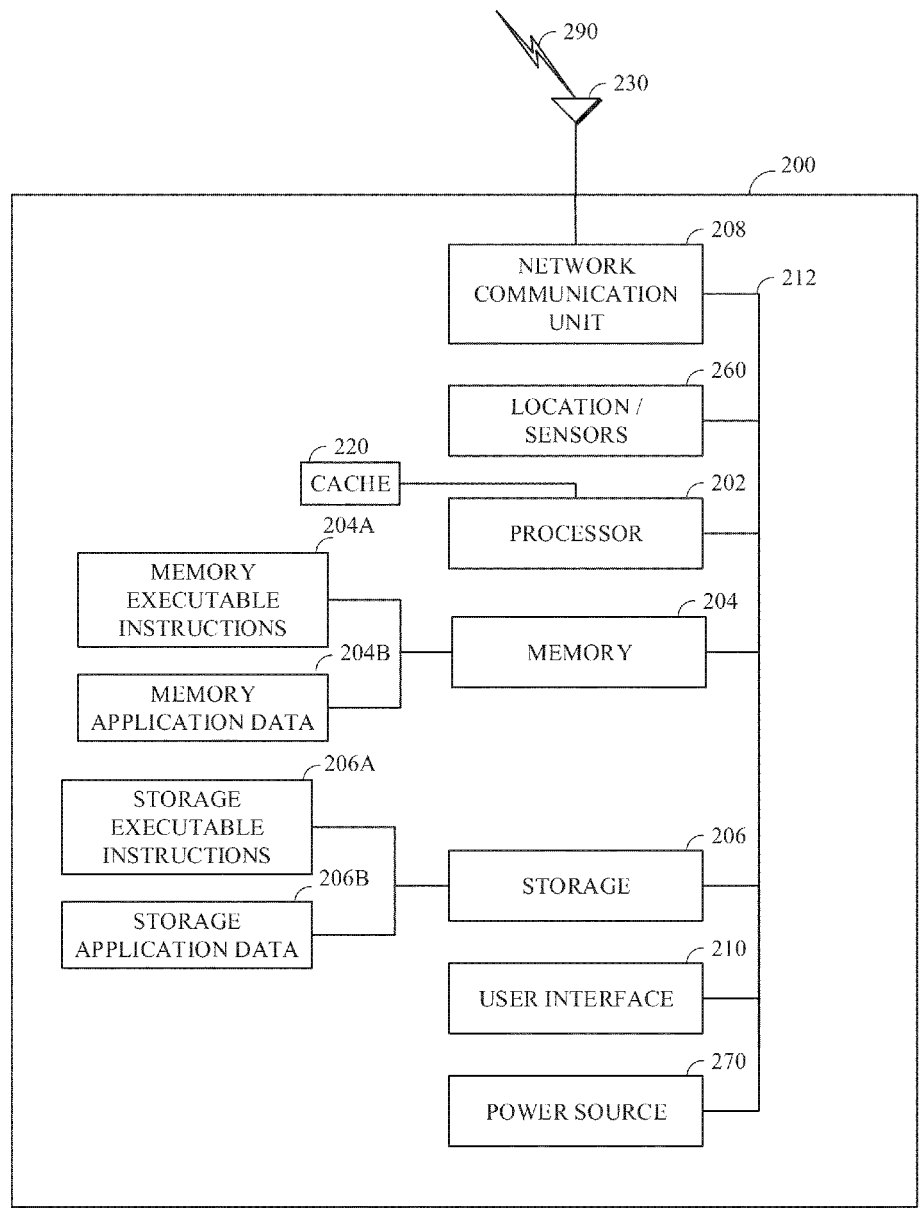
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server device 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
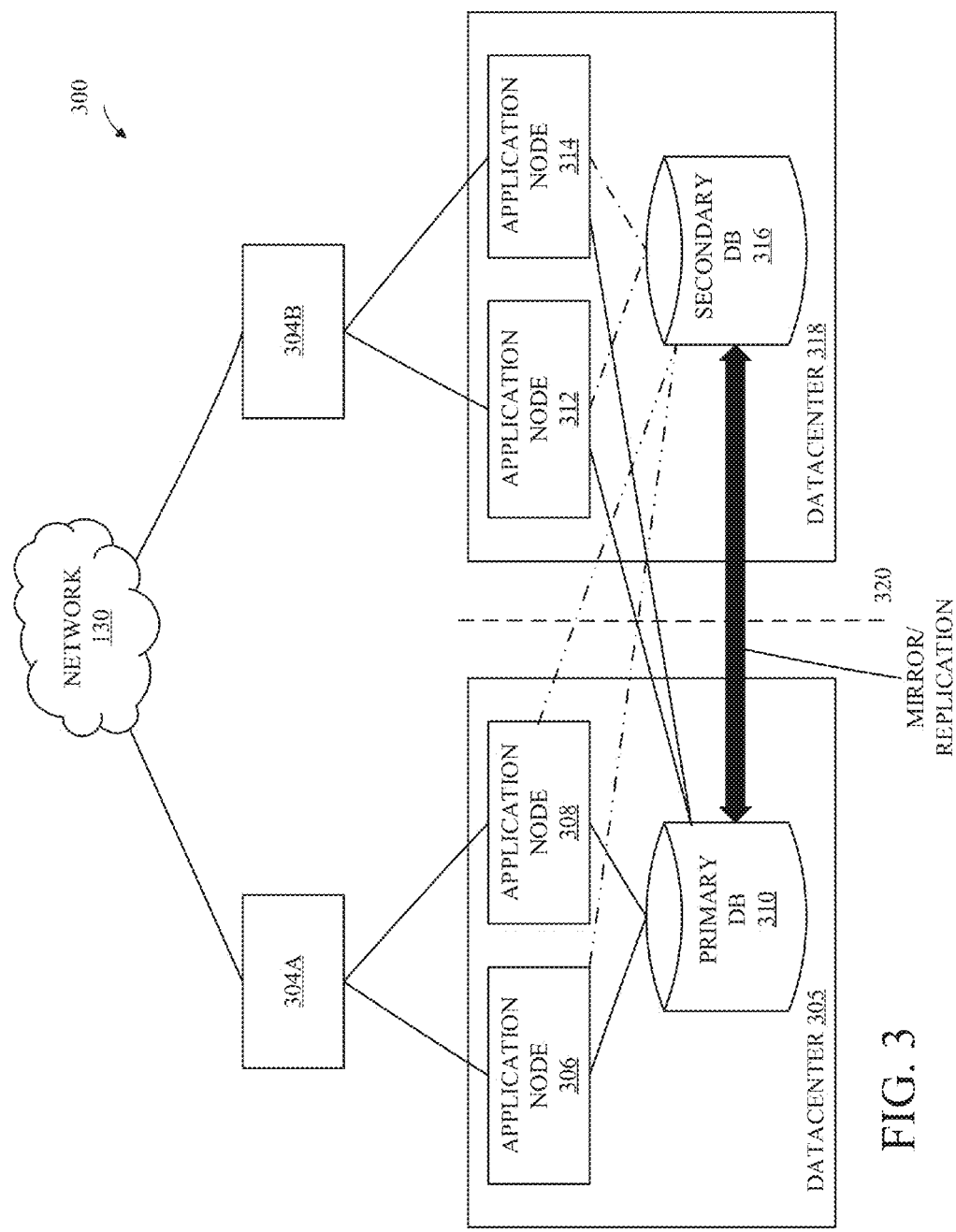
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A-304B and two datacenters 305, 318. The load balancers 304A-304B are coupled to a telecommunications network graphically depicted by network 130. Load balancers 304A-304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between datacenters 305 and 318. Depending upon the intended application, the databases 310, 316 may be implemented using, for example, a relational database management system (RDBMS), an object database, an XML database, flat files, or the like. In an implementation, data centers 305, 318 include web servers (e.g., Apache installations) implemented on physical hardware servers (e.g., servers 122 of data center 120 of FIG. 1) for processing client requests to access resources of a customer computer network.

Each datacenter can include two application nodes 306, 308, 312, 314, although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with the databases 310 and 316 filling this role. In an implementation, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines. In an implementation, primary database 310 and/or secondary database 316 can be a database server catalog, for example, a MySQL catalog.

As mentioned above, each datacenter 305, 318 may have its own load balancer 304A-304B. Each load balancer may be configured to direct traffic to respective servers and processing nodes located within its datacenter. In regard to proxy services, in one example the load balancers 304A-304B are configured to provide a single Internet-delivered service to remote clients via the network 130, where this service is actually provided by a server farm composed of the computerized servers of the datacenters 305, 318. The components 304A-304B also coordinate requests from remote clients to the datacenters 305, 318, simplifying client access by masking the internal configuration of the datacenters. The components 304A-304B may serve these functions by directing clients to processing nodes as configured directly or via DNS. Load balancer 304A-304B can be configured for sticky sessions. With sticky sessions, requests from a client can be forwarded to the same application node 306, 308 for the duration of the client session.

In regard to load balancing, the components 304A-304B can be configured to direct traffic to the secondary datacenter in the event the primary datacenter 305 experiences one of many enumerated conditions predefined as failure. The load balancing functionality of the components 304A-304B can be provided as separate components or as a single component.

The distributed computing system 300 can allocate resources of a computer network using a multi-tenant or single-tenant architecture. Under a multi-tenant architecture, installations or instantiations of application, database, and/or other software application servers may be shared amongst multiple customers. For example, a web server (e.g., a unitary Apache installation), application server (e.g., unitary Java Virtual Machine) and/or a single database server catalog (e.g., a unitary MySQL catalog) may handle requests from multiple customers. In an implementation of this architecture, the application and/or database server software can distinguish between and segregate data and other information of the various customers using the system.

In a single-tenant infrastructure, separate web servers, application servers, and/or database servers can be provisioned for each customer instance. In an implementation, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an implementation, a customer instance comprises multiple web server instances, multiple application server instances, and multiple database server instances. The server instances may be located on different physical servers and share resources of the different physical servers with a number of other server instances associated with other customer instances. In a given cloud computing system, different implementations of customer instances may be used for different customer instances at the same time. Other configurations and implementations of customer instances may also be used. For example, in an implementation, web server and application server functionality are treated as a single unit (of which there may be multiple units present), each unit being installed on respective physical servers.

Certain operational aspects of the disclosure will now be described with reference to FIGS. 4 through 7. Generally, FIGS. 4 through 7 describe features and implementations related to the deployment of network resources. The deployment may be performed by servers executing a cloud computing instance (e.g., implemented via application nodes and databases, such as application nodes 306, 308 and database 310 of FIG. 3) including a database (e.g., a CMDB) populated with records of resources (e.g., CIs) of the computer network. The features and implementations associated with deployment of network resources can be included, in whole or in part, as part of one or more graphical display regions for outputting data to display for a user. In an implementation, a graphical display region can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Figure 4:
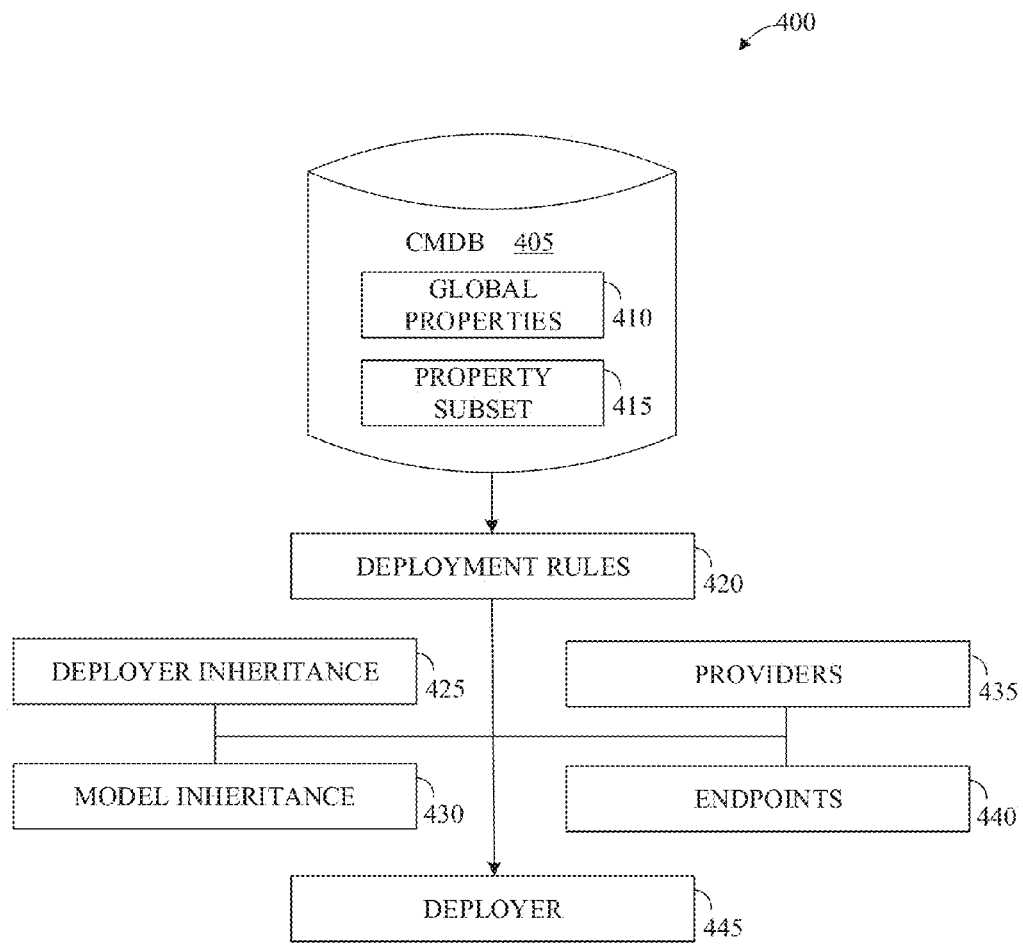
FIG. 4 is a diagram of an implementation of a system for deployment of a network resource based on a containment structure.

FIG. 4 is a diagram 400 of an implementation of a system for deployment of a network resource based on a containment structure. In an implementation, CMDB 405 can be a configuration management database comprising data (e.g., CIs) representative of resources of computing system 100. In an implementation CMDB 405 may also include data indicative of the relationships between the CIs. In an implementation, CMDB 405 can include or be associated with a service model, which can include a collection of CIs associated with a particular customer service environment (e.g., a configuration of deployed services of computing system 100). For example, a service model can describe the CIs and particular relationships used to provide an email service, a web application, a financial application, or the like. A CI can have one or more properties associated with it, for example, for indicating a name, type, feature, function, or other property of the CI, or a relationship to another CI. In an implementation, certain CI properties, can be derived from the resource the CI represents. For example, a CI name property can indicate the name of the corresponding resource and a CI type property can indicate the resource type.

In an implementation, CMDB 405 can include a set of global properties 410 defining a universe of properties that can be associated with CIs of CMDB 405. Global properties 410 can be a set of all properties that can be associated with any CI within CMDB 405, for example, regardless of CI type, the service model in which a CI is included, or the like. In an implementation, global properties 410 can be a library or data store for maintaining a list of CI properties available within CMDB 405.

In an implementation, a property subset 415 can be used to indicate a subset of rules of global properties 410 that can be associated with a particular CI. For example, property subset 415 can define a subset of properties of global properties 410 that can be associated with a CI representing a Tomcat web server, such as a configuration file (e.g., tomcat.config) indicative of settings for the Tomcat, a WAR file (e.g., tomcat.war) configured to be run on the Tomcat, a port on which the Tomcat operates (e.g., tomcat.port), etc. In an implementation, property subset 415 can be implemented within CMDB 405. In an implementation, property subset 415 can be implemented, for example, on a database layer operating on top of CMDB 405. In an implementation, the properties included within property subset 415 for association with a CI type can be defined based on the operation of the CI type. For example, the tomcat CI type can have associated with it a property specifying a WAR file hosted on or contained by the Tomcat; however, other CI types, such as a MySQL CI type, cannot have a WAR file property since MySQL does not use and is not used by WAR files. As such, by defining the properties that can be associated with a CI type, property subset 415 can also indicate (e.g., by omission) the properties that cannot be associated with the CI type.

Deployment rules 420 can be used to further define the properties with which a resource is to be provisioned within a computer network based on connected CIs in CMDB 405. In an implementation, deployment rules 420 can include containment rules and hosting rules that describe a relationship type between two CI types. Each set of rules can model the data from a different perspective of a CI. In an implementation, containment rules can represent a configuration hierarchy, wherein each containment rule can describe the CIs that are contained by a subject CI, for example, in a parent/child relationship. For example, a containment rule can be used to show that a Tomcat CI contains a WAR CI, such that the Tomcat CI is the parent and the WAR CI is the child. In an implementation, hosting rules can represent the placement of the CIs in a business definition, wherein each hosting rule can describe a CI corresponding to a resource on which a resource corresponding to the subject CI runs. For example, a hosting rule can be used to show that a software resource CI runs on a hardware resource CI. In that the same relationship type can be used in a hosting rule and in a containment rule, in an implementation, the term "containment relationship" can refer to a relationship between CIs based on one or more hosting rules and/or containment rules. The context in which the relationship is used may be utilized to distinguish between a containment rule and a hosting rule, and plugins that have been activated on an instance may be utilized to determine which hosting and containment rules are available by default.

The collection of containment rules may represent the CI hierarchy for a CI type. Containment rules may specify the relationship between a CI type and another valid CI type that it can contain or be contained by in the service definition. The rules may be chained to each other in a containment rules group, with a CI type that is the top-level parent (e.g., a root CI) of the group. Containment rules may be viewed as logical concepts and represent logical CIs, for example, to describe software that runs on a server. To designate that data flows into or from a CI type, an endpoint may be added to the rule for that CI type. Child rules should not be added after an endpoint. Containment rules may be stored in CMDB 405. Containment rules may be used to describe which CIs are contained by a given CI. Containment rules can be used to help identify dependent CIs correctly during the business discovery process and service mapping.

Hosting rules may be used to represent valid combinations for pairs of hosting and hosted CIs in the service definition. In an implementation, hosting rules may be a flat set of rules that can be one level deep, and may be created for resources, typically physical or virtual hardware. Each hosting rule may be a standalone rule between two CI types, and specify a relationship between a CI type and another valid CI type that it can host or be hosted on in the service definition. A hosting rule may comprise a parent CI type, a relationship type and a child CI type. For example, a hosting rule can specify that a particular application type runs on a particular hardware type. If a CI is hosted on multiple resources (such as Windows and Linux), a separate hosting rule may be created for the CI with each resource that it can be hosted on.

In an implementation, deployment rules 420, as applied to property subset 415, can define a containment structure usable by a deployer for provisioning a resource based on its CI. For example, the containment structure can include information indicating the properties that can be included within a CI based on CI type (e.g., via property subset 415), as modified by deployment rules 420 (e.g., based on relationships between the CI and other CIs in CMDB 405). In an implementation, property subset 415 can define a first set of properties that can be included within a CI and deployment rules 420 can define a subset of property subset 415 based, for example, on the containment structure. The containment structure can thus be used to create a deployer 445, for example, by defining the values usable for configuring deployer 445. In an implementation, deployer 445 can be a deployer agent used by a server to provision a resource of a computer network based, for example, on property subset 415 and the containment structure. In an implementation, after provisioning the resource, the deployer agent can cause the resource to be deployed for activation on infrastructure within the computer network, for example, by communicating instructions for executing the resource on the infrastructure using the provisioned properties.

Other implements can be used in concert with the containment structure to create deployer 445. In an implementation, deployer 445 can be created based on configurations specified via one or more of a deployer inheritance 425, a model inheritance 430, providers 435, or endpoints 440. In an implementation, deployer inheritance 425 can refer to the ability to inherit, or copy, configurations for deployer 445 from an existing deployer. For example, the configurations for an existing deployer (e.g., a CI type to which it pertains, a provider for executing the deployer, etc.) can be inherited as a starting point for creating deployer 445. In an implementation, deployer inheritance 425 includes automatically relating deployer 445 to a same CI type as associated with the existing deployer used for inheritance. In an implementation, model inheritance can refer to the ability for deployer 445 to inherit a model of an existing deployer without inheriting specific configurations from it. The model can describe a deployment structure (e.g., containment relationships for CIs representing network resources to be provisioned) and properties to use for configuring an inheriting deployer. For example, a parent Tomcat deployer can include a deployment structure including a Tomcat and a WAR, and properties such as a configuration property and a log level property. A child Tomcat deployer can inherit the model of the parent Tomcat deployer so that it too includes the same deployment structure and properties; however, the child Tomcat deployer can include different values for the properties from those of the parent Tomcat deployer and/or extend the deployment structure or properties beyond what was inherited, for example, by adding a log path property. In an implementation, providers 435 can refer to configuration management tools (e.g., ServiceNow, etc.) that can be assigned to execute the deployer. In this way, deployer 445 can be extended to include configurations specific to the assigned provider, such as a certificate used to connect to a provider's server. In an implementation, different providers can be assigned to execute different deployment actions for configuring a CI by a deployer. In an implementation, endpoints 440 can refer to a process for defining endpoints supportable by deployer 445, for example, for indicating where and how to invoke a resource for a particular CI or CI type. For example, a Tomcat CI type can have an inbound endpoint indicating an HTTPS protocol for the Tomcat resource and an outbound endpoint indicating a MySQL SQL script for processing data from the Tomcat resource. In an implementation, deployer inheritance 425, model inheritance 430, providers 435, and/or endpoints 440 can be included in the containment structure for indicating the properties available for configuring a CI or CI type.

Figure 5:
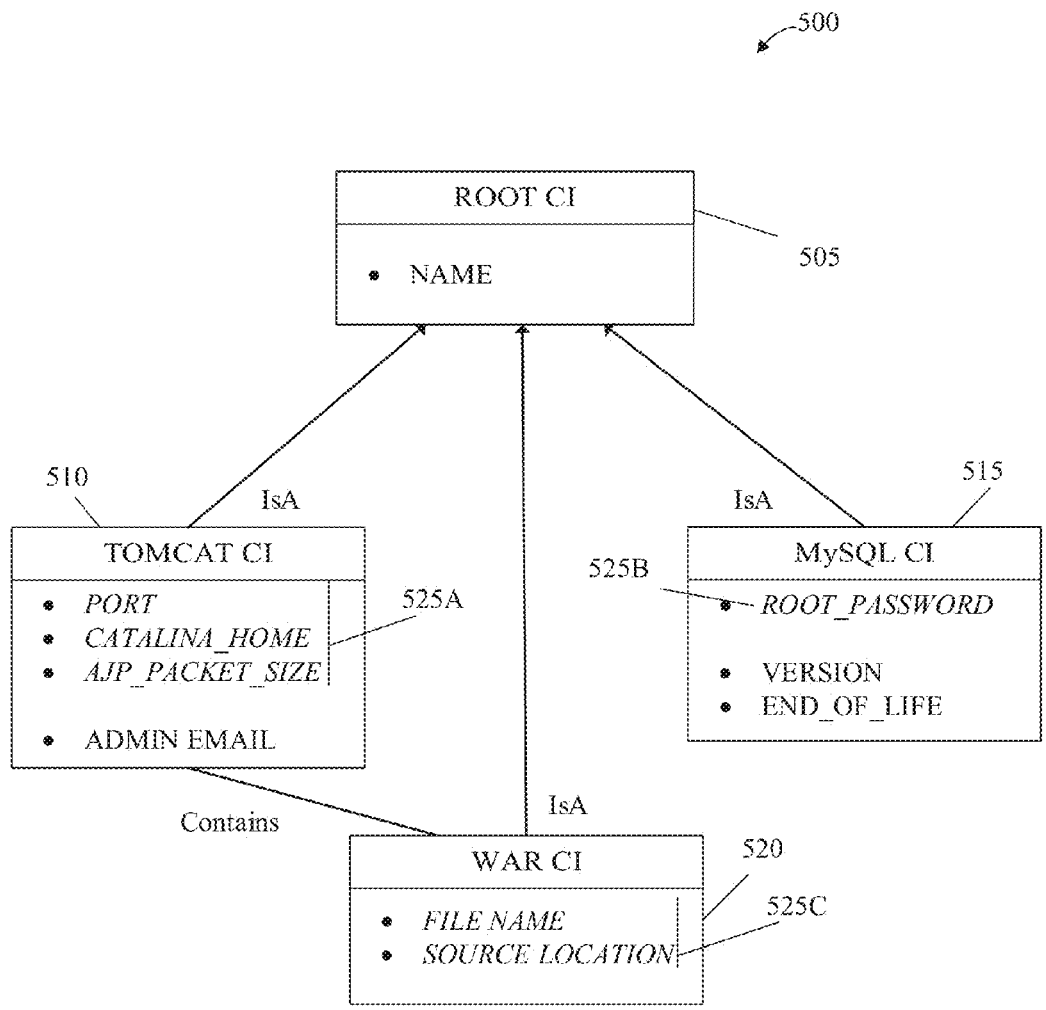
FIG. 5 is a diagram of an implementation of a relationship between records of network resources.

FIG. 5 is a diagram 500 of an implementation of a relationship between records of network resources. Diagram 500 can demonstrate an example of how resources can be provisioned for deployment based on properties included within corresponding CIs, which properties can be indicated from different sources. In an implementation, a root CI 505 can represent an entry point into the CMDB. Root CI 505 can be a CI from which data can be used, for example, as a foundation for other CIs. CIs can include properties based, for example, on the properties available for the corresponding CI type. In an implementation, the properties available for a CI type can be defined by property subset 415 or otherwise determined based on a subset of global properties 410. In an implementation, the properties included based on a CI type can be organized into groups within the CI, for example, based on the usefulness of the property for deployment. The properties that can be included within a CI can be indicated from a parent CI within the CMDB, that is, a CI from which the subject (e.g., child) CI depends within the CMDB. In an implementation, a parent/child relationship can be indicated based on containment or hosting rules. In an implementation, a CI can include properties indicated from a combination of sources, for example, those discussed above.

For example, diagram 500 includes a Tomcat CI 510, a MySQL CI 515, and a WAR CI 520. Tomcat CI 510 and MySQL CI 515 can connect to root CI 505 via an IsA relationship defining a CI type that is based on root CI 505. Through that relationship, Tomcat CI 510 and MySQL CI 515 can inherit properties from root CI 505, for example, the property Name of root CI 505. Contrastingly, WAR CI 520 can connect to Tomcat CI 510 via a Contains relationship defining a parent/child relationship between Tomcat CI 510 and WAR CI 520. In an implementation, the parent/child relationship between Tomcat CI 510 and War CI 520 can be defined by a Hosts relationship, since the Tomcat resource corresponding to Tomcat CI 510 can host the WAR resource corresponding to WAR CI 520. Tomcat CI 510, MySQL CI 515, and WAR CI 520 can also include properties beyond those inherited from root CI 505, for example, based on the properties available for their CI types. As shown in diagram 500, Tomcat CI 510 can include the CI type properties 525A Port, Catalina_Home, AJP_Packet_Size, or the like, based on the Tomcat CI type, whereas MySQL CI 515 can include the CI type property 525B Root Password or the like, and WAR CI 520 can include CI type properties 525C File Name, Source Location, or the like. Tomcat CI 510, MySQL CI 515, and WAR CI 520 can also include other properties that may not be useful for deployment, for example, based on the CI type, default (e.g., out-of-the-box) configurations, or the like. For example, Tomcat CI 510 can include a property Admin Email, and MySQL CI 515 can include the properties Version and End_Of_Life. These properties, while not useful for deployment, can still be included in the CI based on other use. For example, MySQL CI 515 can include the property End_Of_Life because it may be useful for indicating plans for upgrading the CI.

Figures 6A, 6B:
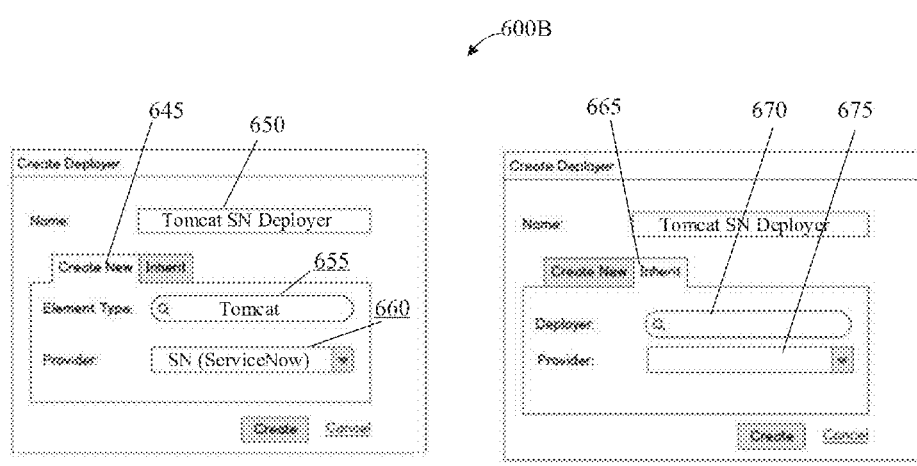
FIG. 6A is an illustration of an implementation of a table comprising records of existing deployers.
FIG. 6B is an illustration of an implementation of creating a deployer.

FIG. 6A is an illustration of an implementation of a table 600A comprising records of existing deployers. In an implementation, table 600A can represent a data store in which the data displayed in table 600A is maintained. For example, table 600A can include a data store included within a CMDB, a data store included in a platform in communication with the CMDB, or the like. In an implementation, a user can browse table 600A for a deployer to use for deployment of one or more resources (e.g., based on CI type) or to select a deployer from which another deployer (e.g., a new deployer to be created, for example, using implementations discussed below with respect to FIG. 6B) can inherit properties for provisioning a resource. In an implementation, a system can browse the data contained in table 600A to select a deployer to use for CI deployment or for inheritance without requiring manual selection by a user. This may be useful where a new deployer may be created for a CI type that has an existing deployer associated with it, but which differs from the existing deployer, for example, because it uses a different parent deployer or provider.

In an implementation, the row entries of table 600A can be indicative of existing deployers, for example, Tomcat ServiceNow Deployer 610 and MySQL ServiceNow Deployer 615. In an implementation, the column entries of table 600A can be indicative of various configurations of the existing deployers. For example, for a given deployer, table 600A can include columns for a name 620, element type 625, parent deployer 630, provider 625, and last modified by identifier. In an implementation, name 620 can be a name manually selected for the deployer by a user or a name generated based on configurations of the deployer, for example, a CI type to which the deployer corresponds and the provider that uses the deployer. In an implementation, element type 625 can indicate the CI type corresponding to the deployer. In an implementation, parent deployer 630 can indicate a deployer from which the subject deployer inherits configurations for deployment of applicable resources. In an implementation, provider 635 can indicate a configuration management tool assigned to execute the deployer. In an implementation, last modified by 640 can indicate a user who last modified configurations of the deployer, for example, based on a common name, username, or other identifier.

FIG. 6B is an illustration of an implementation of creating a deployer. In an implementation, the process of creating a deployer can be performed using dialog box 600B for entering information for configuring the deployer. Other implementations can also or instead be used for allowing a user to input or otherwise select information to be used for creating the deployer. In an implementation, a deployer can be created to provision a resource (e.g., a Tomcat web server instance with serial number S/N 3456U56A) based on properties of a corresponding CI, the CI type (e.g., Tomcat web servers), a service model that includes the CI (e.g., an email service), etc. In an implementation, dialog box 600B can include options 645, 665, respectively for creating a new deployer by selecting the configurations for the deployer or creating a new deployer by inheriting configurations from an existing deployer.

The selection of element 645 can cause dialog box 600B to include elements for receiving user input or selection of deployer configurations. In an implementation, the elements for input or selection can correspond to the configurations included in table 600A. For example, dialog boxes 600B can include a name element 650, an element type element 655, a provider element 660, etc. Separately, the selection of element 665 can cause dialog box 600B to include elements for receiving user input or selection of an existing deployer for configuring the new deployer via inheritance. In an implementation, the input or selection elements usable for inheritance can include a deployer element 670. In an implementation, for example, where some of the configurations between the new deployer and the deployer used for inheritance may differ (e.g., based on the containment structure of a CI representing the resource to be deployed using the new deployer), the input or selection elements usable for inheritance can also include elements for distinguishing configurations of the new deployer from those of the deployer selected using element 670. For example, a provider element 675 can be included to indicate a different provider to be assigned to execute the new deployer.

Figure 7:
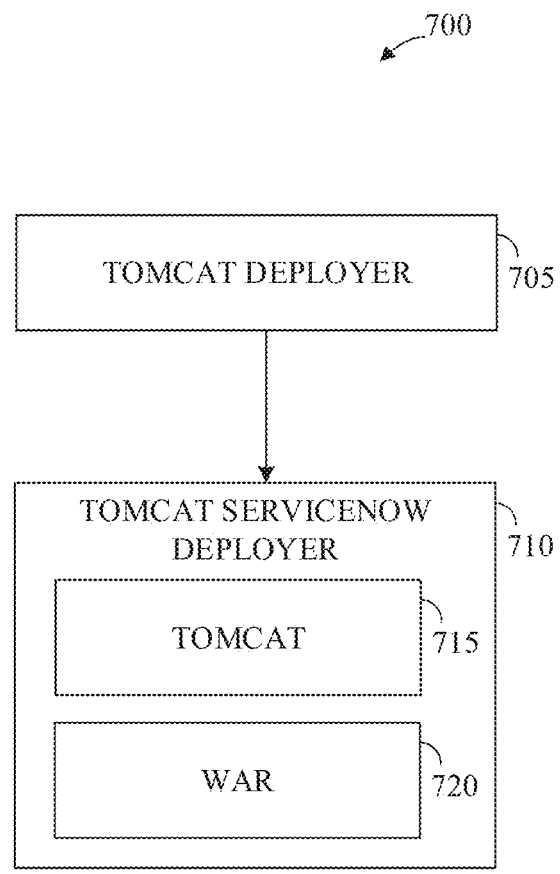
FIG. 7 is a diagram of an implementation of a relationship between deployers.

FIG. 7 is a diagram 700 of an implementation of a relationship between deployers. Diagram 700 can indicate relationships between existing deployers used for provisioning network resources in a cloud computing instance. In an implementation, the relationships can be indicated hierarchically, for example, to indicate dependencies or parent/child relationships between the deployers. In an implementation, the relationships can indicate a deployment rule, such as a containment or hosting rule, associated with the deployers. In an implementation, diagram 700 can include a visualization (e.g., as part of a graphical display region) for a user to reference the relationships between deployers. This can be useful, for example, for identifying deployers that may need to be created for supporting resources. In an implementation, diagram 700 can indicate not only the relationships between deployers, but also CIs corresponding to the resources provisioned by the deployers. In an implementation, a user may be able to edit the configurations for a deployer after selecting it, for example, as part of a visualization within a graphical display region. In an implementation, the editing of a configuration for a selected deployer can cause diagram 700 to refresh, for example, to correct changes to the deployer relationships based on the editing.

For example, diagram 700 can illustrate a relationship between Tomcat Deployer 705 and Tomcat ServiceNow Deployer 710. In an implementation, and as shown in diagram 700, a downward arrow extending from Tomcat Deployer 705 to Tomcat ServiceNow Deployer 710 can indicate that the latter deployer inherited configurations from the former. For example, Tomcat ServiceNow Deployer 710 may comprise the same configurations as Tomcat Deployer 705 except that Tomcat ServiceNow Deployer 710 is configured for execution by provider ServiceNow. In an implementation, Tomcat ServiceNow Deployer 710 can be used to provision Tomcat and WAR resources. For example, a Tomcat 715 can be deployed using Tomcat ServiceNow Deployer 710 based on configurations inherited at least in part from Tomcat Deployer 705. As another example, a WAR file 720 can be deployed using Tomcat ServiceNow Deployer 710 based on a containment structure indicating a parent/child relationship between Tomcat 715 and WAR file 720. Thus, while Tomcat ServiceNow Deployer 710 can be used for deployment of Tomcat 715 and WAR file 720, the properties available for provisioning WAR file 720 can depend upon Tomcat 715.

Further implementations of the disclosure will now be described with reference to FIG. 8. The steps, or operations, of any method, process, or algorithm described in connection with the embodiments disclosed herein may be embodied directly in hardware, firmware, software executed by hardware, circuitry, or a combination of these. Broadly, method 800 of FIG. 8 can be used for deployment of resources in a cloud computing network, such as computing system 100 of FIG. 1. In an implementation, method 800 may be executed using machines and hardware such as the equipment of FIGS. 1, 2, and 3. In an implementation, method 800 may be performed, for example, by executing a machine-readable program of Javascript, C, or other such instructions. Implementations of the present disclosure may include multiple of the above-described features.

For ease of explanation, method 800 is depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

Figure 8:
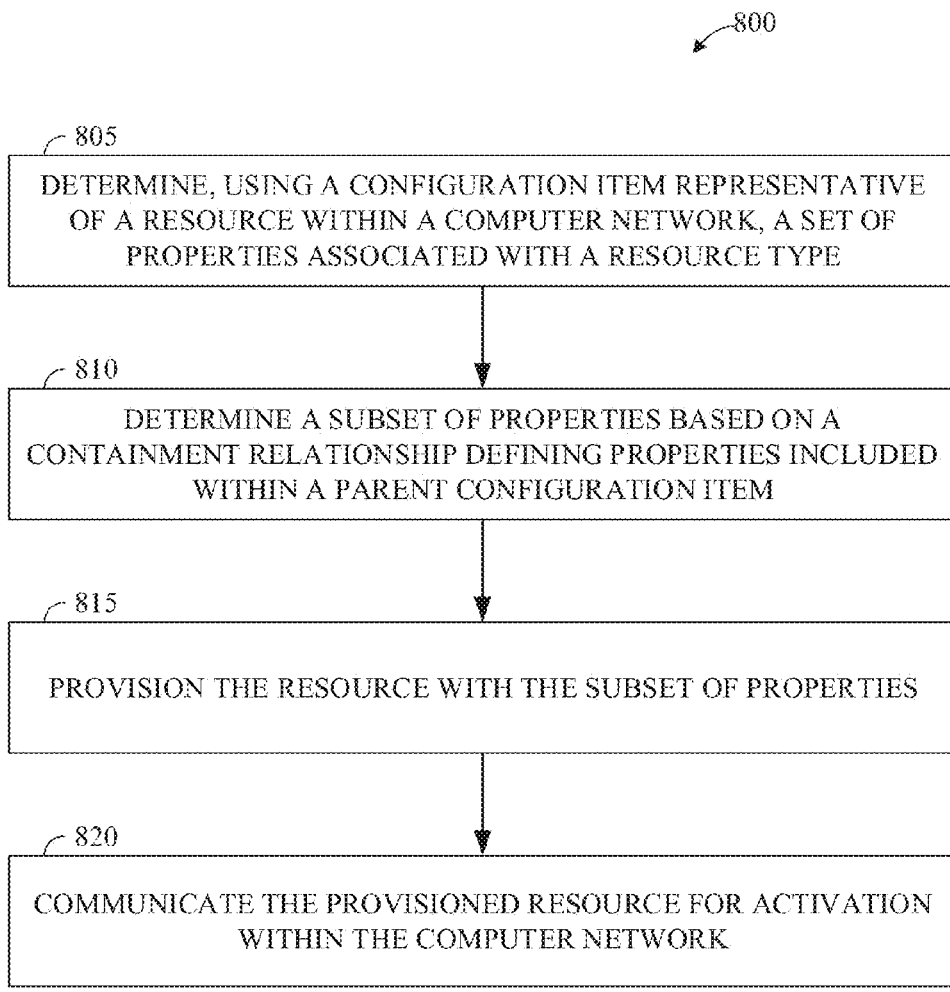
FIG. 8 is a flowchart of an implementation of a method for the deployment of a network resource based on a containment structure.

FIG. 8 is a flowchart of an implementation of a method 800 for the deployment of a network resource based on a containment structure. Method 800 begins at operation 805, where, in an implementation, a set of properties associated with a resource type of a resource to be provisioned within a computer network can be determined. In an implementation, the set of properties can be a first set of properties defined by a subset of global properties available for resources of the computer network. In an implementation, the first set of properties can be determined using a CI of a CMDB associated with the resource to be provisioned. For example, the CMDB can define the global property set comprising a universe of properties that can be included within CIs of the CMDB. The first set of properties can be a subset of the global property set determined based on the resource type of the resource to be provisioned. In this way, a list of properties available for provisioning the resource can be narrowed by focusing on those properties that are usable by the type of the resource.

In an implementation, after determining the set of properties at operation 805, a subset of properties can be determined at operation 810. The subset of properties can be a subset of the set of properties determined at operation 805. In an implementation, the subset of properties can be a second set of properties defined by a subset of the first set of properties discussed above with respect to operation 805. In an implementation, the second set of properties can be determined based on a containment relationship defining the properties included within a parent CI of the CI representative of the resource to be provisioned. For example, the second set of properties can be determined using deployment rules indicating a containment and/or host relationship involving the CI within the CMDB. The relationships between the representative CI and one or more parent CIs in the CMDB can be leveraged to determine the properties that the corresponding resource will use based on how the resource is connected to other resources. In this way, the list of properties available for provisioning the resource can be further narrowed by focusing on those properties that are usable by the resource, for example, based on the context in which the resource is to be used within the computer network.

In an implementation, after determining the subset of properties at operation 810, the resource can be provisioned with the properties of the subset at operation 815. The provisioning of the resource with the determined properties can prepare the resource for deployment. In an implementation, the provisioning of the resource with the determined properties can be done by a deployment agent. For example, the deployment agent can be created or otherwise configured with the properties determined at operations 805 and 810. In an implementation, the deployment agent can be created to deploy the particular resource being provisioned. In an implementation, the provisioning of the resource with the determined properties can refer to a process for modifying the properties of the resource on an infrastructure resource on which the resource is to be activated, such as a server within a datacenter. For example, data fields corresponding to the determined properties can be created or prepared to receive values for activating the resource.

In an implementation, at operation 820, the provisioned resource can be deployed to infrastructure within the computer network. In an implementation, deployment to infrastructure can refer to a provisioned resource being activated on hardware used within a computer system (e.g., a physical server operating on application node 306 at datacenter 305). In an implementation, the activation can refer to the installation or execution of the resource on the hardware. The provisioned resource can be communicated for activation, for example, by a network interface of a computer on which the resource is provisioned, such as network communication unit 208 of computing device 200. In an implementation, the communication of the provisioned resource by a network interface can comprise the network interface transmitting instructions for activating the resource using the properties with which it was provisioned, for example, at operation 815.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for provisioning resources within a computer network, the system comprising:
   a processor;
   a network interface;
   a memory; and
   a configuration management database (CMDB) storing configuration items representative of resources of the computer network, wherein the CMDB defines a global property set that includes properties of the resources, and wherein the configuration items include one or more properties of the global property set;
   wherein the memory includes instructions executable by the processor to cause the processor to:
      configure a deployment agent to provision a new resource of the computer network with properties, the resource having a resource type, by:
         determining, using a configuration item representative of the resource within the CMDB, a first set of properties associated with the resource type, wherein the first set of properties comprises a subset of the global property set; and
         determining a second set of properties based on one or more deployment rules, wherein the second set of properties comprises one or more properties of a parent configuration item of the configuration item representative of the resource, and wherein the second set of properties comprises a subset of the first set of properties;
      provision, by the deployment agent, the resource with the second set of properties; and
      communicate, by the network interface, the provisioned resource for activation within the computer network.

2. The system, as set forth in claim 1, wherein the first subset of properties comprises properties particular to the configuration item representative of the resource.

3. The system, as set forth in claim 1, wherein the one or more deployment rules comprise one or more containment rules related to a configuration hierarchy of configuration items of one or more resources of the computer network.

4. The system, as set forth in claim 3, wherein the second subset of properties comprise relationships between the configuration item representative of the resource and other configuration items stored in the CMDB.

5. The system, as set forth in claim 1, wherein the one or more deployment rules comprise one or more hosting rules related to valid combinations of hosting configuration items and hosted configuration items of one or more resources of the computer network.

6. The system, as set forth in claim 5, wherein the second subset of properties comprise a configuration item corresponding to a resource on which the provisioned resource runs.

7. The system, as set forth in claim 1, wherein the one or more deployment rules are applied to the first subset of properties to obtain the second subset of properties.

8. The system, as set forth in claim 1, wherein the one or more deployment rules define a containment structure useable by the deployment agent to provision the resource based on the configuration item of the resource.

9. The system, as set forth in claim 8, wherein the memory includes instructions executable by the processor to cause the processor to configure the deployment agent based on the containment structure.

10. The system, as set forth in claim 1, wherein the memory includes instructions executable by the processor to cause the processor to configure the deployment agent based on a configuration of an existing deployment agent, wherein the deployment agent is configured using specific properties of the existing deployment agent relating to a same configuration item type as the configuration item of the resource.

11. The system, as set forth in claim 1, wherein the memory includes instructions executable by the processor to cause the processor to configure the deployment agent based on a model of an existing deployment agent, wherein the deployment agent is configured using a deployment structure of the existing deployment agent.

12. The system, as set forth in claim 1, wherein the memory includes instructions executable by the processor to cause the processor to provision, by the deployment agent, the resource by modifying the resource with the second set of properties.

13. The system, as set forth in claim 1, wherein the memory includes instructions executable by the processor to cause the processor to activate the provisioned resource on a hardware resource of the computer network.

14. A method for provisioning a new resource having a resource type within a computer network associated with a configuration management database (CMDB) storing configuration items representative of resources of the computer network, wherein the CMDB defines a global property set that includes properties of the resources, and wherein the configuration items include one or more properties of the global property set, the method comprising:

determining a first set of properties associated with the resource type using a configuration item representative of the resource within the CMDB, wherein the first set of properties comprises a subset of the global property set;

determining a second set of properties based on one or more deployment rules, wherein the second set of properties comprises one or more properties of a parent configuration item of the configuration item representative of the resource, and wherein the second set of properties comprises a subset of the first set of properties;

provisioning the resource with the second set of properties; and communicating the provisioned resource for activation within the computer network.

15. The method, as set forth in claim 14, wherein the first subset of properties comprises properties particular to the configuration item representative of the resource.

16. The method, as set forth in claim 14, wherein the one or more deployment rules comprise one or more containment rules related to a configuration hierarchy of configuration items of one or more resources of the computer network.

17. The method, as set forth in claim 16, wherein the second subset of properties comprise relationships between the configuration item representative of the resource and other configuration items stored in the CMDB.

18. The method, as set forth in claim 14, wherein the one or more deployment rules comprise one or more hosting rules related to valid combinations of hosting configuration items and hosted configuration items of one or more resources of the computer network.

19. The method, as set forth in claim 18, wherein the second subset of properties comprise a configuration item corresponding to a resource on which the provisioned resource runs.

20. The method, as set forth in claim 14, comprising applying the one or more deployment rules to the first subset of properties to obtain the second subset of properties.

21. The method, as set forth in claim 14, comprising defining a containment structure useable by a deployment agent to provision the resource based on the configuration item of the resource using the one or more deployment rules.

22. The method, as set forth in claim 21, comprising configuring the deployment agent based on the containment structure.

23. The method, as set forth in claim 14, comprising configuring a deployment agent based on a configuration of an existing deployment agent, wherein the deployment agent is configured using specific properties of the existing deployment agent relating to a same configuration item type as the configuration item of the resource.

24. The method, as set forth in claim 14, comprising configuring a deployment agent based on a model of an existing deployment agent, wherein the deployment agent is configured using a deployment structure of the existing deployment agent.

25. The method, as set forth in claim 14, comprising provisioning the resource by modifying the resource with the second set of properties.

26. The method, as set forth in claim 14, comprising activating the provisioned resource on a hardware resource of the computer network.

* * * * *